US008045855B2

(12) United States Patent
Frankel

(10) Patent No.: US 8,045,855 B2
(45) Date of Patent: Oct. 25, 2011

(54) SYSTEMS AND METHODS FOR THE MITIGATION OF POLARIZATION MODE DISPERSION IMPAIRMENTS IN FIBER OPTIC LINKS

(75) Inventor: Michael Y. Frankel, Baltimore, MD (US)

(73) Assignee: Ciena Corporation, Linthicum, MD (US)

(*) Notice: Subject to any disclaimer, the term of this patent is extended or adjusted under 35 U.S.C. 154(b) by 753 days.

(21) Appl. No.: 12/115,818

(22) Filed: May 6, 2008

(65) Prior Publication Data

US 2009/0279900 A1 Nov. 12, 2009

(51) Int. Cl.
H04B 10/00 (2006.01)
H04B 10/04 (2006.01)
H04J 14/00 (2006.01)

(52) U.S. Cl. ............ 398/65; 398/152; 398/158; 398/184
(58) Field of Classification Search ............... 398/65, 398/152, 154, 158, 184, 192
See application file for complete search history.

(56) References Cited

U.S. PATENT DOCUMENTS

| 6,433,904 | B1* | 8/2002 | Swanson et al. | 398/91 |
| 2004/0202396 | A1* | 10/2004 | Chung et al. | 385/1 |
| 2006/0153575 | A1* | 7/2006 | Bulow | 398/155 |

OTHER PUBLICATIONS

S. P. Jung, J. H. Lee, E. S. Son, H. C. Ji, and Y. C. Chung; "Multi-Channel PMD Compensation Based on Distributed Polarization Control"; Korea Advanced Institute of Science and Technology Department of Electrical Engineering; 373-1 Guseong-dong, Yuseong-gu, Daejeon 305-701, Korea; OCIS codes: (060.2360) Fiber optics links and subsystems; (C)2005 Optical Society of America.

M. Brodsky (1), M. Boroditsky (1), P. Magill (1), N.J. Frigo (1), M. Tur (2); "Channel-to-Channel Variation of Non-Maxwellian Statistics of DGD in a Field Installed System"; AT&T Labs Research, 200 Laurel Ave. S., Middletown, NJ 07748 USA; 2: Faculty of Engineering, Tel Aviv University, Tel Aviv, Isreal 69978; IEEE Newsletter; (C)2003 IEEE.

Chongjin Xie, and Xiang Liu; "Mitigation of Polarization-Mode Dispersion in Multichannel Lightwave Transmission Systems"; Authors with Bell Laboratories, Lucent Technologies, Holmdel, NJ 07733 USA; Manuscript received Dec. 16, 2002; revised Mar. 18, 2003; (C)2002 IEEE.

(Continued)

Primary Examiner — Dalzid Singh
(74) Attorney, Agent, or Firm — Clements Bernard PLLC; Christopher L. Bernard; Lawrence A. Baratta, Jr.

(57) ABSTRACT

The present invention provides systems and methods for the mitigation of PMD impairments in fiber optic links. The present invention utilizes synchronous polarization modulation and digital control of polarization modulation, instead of independent polarization modulators and analog control used in the current state of art. Also, the present invention utilizes a feedback loop to avoid identified bad polarization states instead of a random open loop operation. Further, the present invention includes a mechanism to continually update polarization states based on pre-corrected FEC error analysis from data receivers. Additionally, the present invention includes a mechanism for collecting and correlating error feedback signals from multiple geographically-diverse network nodes. Advantageously, the present invention provides a cost-effective and efficient way to implement mitigation of PMD impairments, while using only a small fraction of the FEC error correction capability.

20 Claims, 7 Drawing Sheets

OTHER PUBLICATIONS

Lothar Moller and Jeffrey H. Sinsky (Member, IEEE); "Time-Sharing of Compensators as a PMD Mitigation Approach for Multichannel Transmission Systems"; Authors with Photonic Networks Research Department, Bell Laboratories, Lucent Technologies, Holmdel, NJ; Manuscript received Aug. 28, 2001; revised Dec. 17, 2001.

Misha Boroditsky, Misha Brodsky, Nicholas J. Frigo, Member, IEEE, Peter Magill, and L. Raddatz; "In-Service Measurements of Polarization-Mode Dispersion and Correlation to Bit-Error Rate"; AT&T Labs, Middletown, NJ 07748 and Lucent Technologies, Nurnberg, Germany; Manuscript received Nov. 3, 2002; revised Dec. 18, 2002; (C)2003 IEEE.

Misha Brodsky, and Nicholas J. Frigo, Misha Boroditsky, and Moshe Tur; "Polarization Mode Dispersion of Installed Fibers"; AT&T Labs Research, Middletown, NJ; Physics Department, US Naval Academy, Annapolis, MD; Statistical Arbitrage Group, Knight Equity Markets, Jersey City, NJ; Faculty of Engienering, Tel Aviv University, Tel Aviv, Israel; Manuscript received Sep. 18, 2006; (C)2006 IEEE.

\* cited by examiner

SYSTEMS AND METHODS FOR THE MITIGATION OF POLARIZATION MODE DISPERSION IMPAIRMENTS IN FIBER OPTIC LINKS

FIELD OF THE INVENTION

The present invention relates generally to the optical communications and optical networking fields. More specifically, the present invention relates to systems and methods for the mitigation of polarization mode dispersion (PMD) impairments in fiber optic links.

BACKGROUND OF THE INVENTION

Optical networks are continuously evolving in order to meet ever-increasing voice and data traffic demands. There is a need for increased multi-channel capacity in wavelength division multiplexed (WDM) and dense wavelength division multiplexed (DWDM) systems, increased reliability, and reduced cost. Conventional optical networks can utilize forward error correction (FEC) in order to improve system margins, to lower overall network costs, to improve optical layer operations, administration, and maintenance (OAM), and to improve network reliability.

FEC is a methodology that enables bits that have been received but improperly decoded to be detected and corrected. Each frame of working data includes corresponding error-check data. Among other things, FEC allows a system to utilize a decreased signal-to-noise ratio (SNR), while maintaining a fixed error probability. Advantageously, FEC is able to correct a specific fraction of the errored data completely, regardless of the source of the errors. For example, decreased SNR means that optical amplifiers can be spaced at longer distances, reducing cost, and that a faster signal may be used, for example. A further advantage is optical component performance can be lowered with a corresponding cost decrease, while still maintaining error free data transmission after the FEC. One of such optical impairments can be Polarization Mode Dispersion (PMD), which generally arises in older, lower quality transmission fiber. Disadvantageously, the inclusion of error-check data means that increased bandwidth, as well as increased transmitter and receiver complexity, are required. A further disadvantage is FEC's limited ability to deal with error bursts, i.e. with a long sequence of errored bits.

PMD is an increasing concern for modern fiber-optic networks. The increased requirements for capacity are continually driving channel data rates up from predominantly 2.5 Gb/s several years ago, to more recent 10 Gb/s, to a current transition to 40 Gb/s rates with 100 Gb/s rates being actively studied for next generation systems. PMD results as light travels down a single-mode fiber in two inherent polarization modes. When the core of the fiber is asymmetric, the light traveling along one polarization mode faster or slower than the light traveling along the other polarization mode, resulting in a pulse overlapping with others, or distorting the pulse to such a degree that it is undetectable by a receiver. PMD concerns are compounded in today's high-speed transmission optical networks, since PMD impairment scales linearly with data rate. For example, a 100 Gb/s signal is 10 times more susceptible to PMD than a similarly modulated 10 Gb/s signal. Further, PMD varies dynamically with temperature changes, infinitesimal asymmetries in the fiber core, etc., and impacts diverse wavelength channels differently. Thus, it is a wavelength and time-dependent impairment. The time constant of the PMD impairment is related to the mechanic and thermal perturbations associated with the optical transmission path.

Rapid mechanical changes can result in sub-millisecond changes, while buried fiber-optic cable can be quite stable for months. A typical time constant is in the range of 100 ms to many minutes, with the data errors being produced within the corresponding time periods. Thus, PMD-induced errors tend to be bursty, generally exceed the FEC correction capability, and present a significant challenge. Several recent investigations have shown that a typical fiber-optic transmission system with buried fiber cable segments can be represented as stable on very long time scales and to have a finite PMD value. These PMD-causing segments are separated by small fiber lengths that correspond to optical amplifier locations, and are responsible for fast polarization rotation. This representation is frequently referred to as a "hinge model", with polarization rotation inducing exposed hinges separated by substantially stable PMD-causing cable segments.

The mitigation of PMD-induced impairments can be divided into two general categories. First, channel-based PMD compensators are used at receivers. This approach requires a single expensive device for each WDM channel. Attempts have been made to reduce the number of required compensators by sharing a single unit for several channels, but this approach is still expensive and control is cumbersome. A second approach uses the natural error correction property associated with FEC. Since PMD impairments tend to have intrinsic long time constants, an additional external mechanism is introduced to rapidly and continuously perturb optical signal polarization. Such rapid polarization rotation distributes PMD errors more randomly, and makes FEC algorithms more effective in correcting them if randomization occurs within the FEC code block length.

The primary limitation of the present state of the art is the focus on complete randomization of the polarization states. Thus, the performance of each wavelength channel rapidly covers a large fraction of the possible performance states, including ones that induce low penalties and ones that induce high penalties. A channel experiences high penalties for at least a fraction of the FEC block length, and some of the FEC correction capability is thus spent on the PMD problem. Less FEC error correction capability is available for other impairments, such as optical noise, nonlinear effects, linear cross talk effects, etc. What we desire is a mechanism that would still mitigate PMD impairment, while minimizing the amount of FEC capability allocated to this particular impairment.

S. P. Jung, et al. describe the use of in-line polarization controllers between fiber-optic segments to controllably realign polarizations to improve the performance of worst-case PMD channel. S. P. Jung, et al. "Multi-channel PMD compensation based on distributed polarization control," OFC 2005, vol. 3, March 2005, paper JWA18. The paper suggests the use of dither of polarization control stages with feedback from PMD monitoring of an aggregate sum PMD impairment for all WDM signals. This approach suffers from several limitations, as follows: aggregate PMD monitoring for all WDM signals relying on RF spectrum is not applicable to a number of channels over ~4, aggregate PMD monitoring is not applicable when channels use different modulation formats or data rates. Further, the feedback loop takes too long to close, as there is intrinsic fiber delay of ~10 ms associated with a round trip time over 1000 km of a typical fiber link, and the paper does not discuss a mechanism for dealing with highly meshed networks with many optical add/drop multiplexers, where WDM channels may traverse many different overlapping fiber segments.

Thus, present state of the art has numerous performance, cost and control algorithm limitation which the present invention proposes to overcome.

BRIEF SUMMARY OF THE INVENTION

In various exemplary embodiments, the present invention provides systems and methods for the mitigation of PMD impairments in fiber optic links. The present invention utilizes synchronous polarization modulation and digital control of polarization modulation, instead of independent polarization modulators and analog control used in the current state of art. Also, the present invention utilizes a feedback loop to avoid identified bad polarization states instead of a random open loop operation. Further, the present invention includes a mechanism to continually update and improve polarization states based on pre-corrected FEC error analysis from data receivers. Additionally, the present invention includes a mechanism for collecting and correlating error feedback signals from multiple geographically-diverse network nodes. Advantageously, the present invention provides a cost-effective and efficient way to implement mitigation of PMD impairments, while using only a small fraction of the FEC error correction capability.

In an exemplary embodiment of the present invention, a method for mitigating polarization mode dispersion impairments in fiber optic links includes: (a) synchronizing a clock associated with a polarization controller and a clock associated with an optical receiver; (b) detecting pre-corrected FEC errors at the optical receiver; (c) identifying a time correlation to corresponding to the error rates at receivers; and (d) dynamically adjusting the polarization controller. Optionally, the polarization controller includes a first polarization controller and the optical receiver includes a first optical receiver; and the method further includes synchronizing a clock associated with a second polarization controller, a clock associated with a second optical receiver, the clock associated with the first optical receiver, and the clock associated with the first polarization controller; detecting burst errors at either the first optical receiver or the second optical receiver; identifying a time corresponding to the pre-corrected FEC errors; identifying specific polarization states on the first polarization controller and the second polarization controller corresponding to the time; and dynamically adjusting the first polarization controller and the second polarization controller. The first polarization controller and the second polarization controller utilize synchronous polarization modulation control. The method can further include repeating steps (a) through (e) over time; updating polarization states to improve worst-case receiver pre-corrected FEC error rate over time; and providing the polarization controller information on improved polarization states.

Alternatively, the polarization controller includes a first polarization controller and the optical receiver includes a first optical receiver; and the method further includes: synchronizing a clock for each of a plurality of polarization controllers, a clock for each of a plurality of optical receivers, the clock associated with the first optical receiver, and the clock associated with the first polarization controller; detecting pre-corrected FEC errors at either the first optical receiver or any of the plurality of optical receivers; identifying a time corresponding to the worst-case pre-corrected FEC error rates; identifying specific polarization states on the first polarization controller and each of the plurality of polarization controllers corresponding to the time; and dynamically adjusting the first polarization controller and each of the plurality of polarization controllers. The dynamically adjusting step avoids error prone polarization states responsive to the identifying specific polarization states step. Optionally, the dynamically adjusting step includes a dynamic control algorithm including one of gradient search, particle swarm optimization, genetic algorithms, and simulated annealing. The synchronizing step can be performed through one of a time stamp in an optical supervisory channel and a time stamp message superimposed onto an optical channel.

In another exemplary embodiment of the present invention, a system for mitigating polarization mode dispersion impairments in fiber optic links includes a processor connected to a plurality of polarization controllers and to a plurality of receivers, wherein a clock associated with each of the processor, the plurality of polarization controllers, and the plurality of receivers is synchronized. The processor is configured to: receive data regarding pre-corrected FEC error rates at one of the plurality of optical receivers; identify a time and polarization states on each of the plurality of polarization controllers corresponding to the data; and provide feedback to each of the plurality of polarization controllers responsive to the polarization states corresponding to the pre-corrected FEC error rates. Each of the plurality of polarization controllers is configured to dynamically adjust responsive to the feedback. Optionally, the processor is further configured to maintain statistics corresponding to improved polarization states based on pre-corrected FEC error analysis over time. The processor can be further configured to update each of the plurality of polarization controllers through the feedback with the improved polarization states. Optionally, the clock associated with each of the processor, the plurality of polarization controllers, and the plurality of receivers is synchronized through one of a time stamp in an optical supervisory channel and a time stamp message superimposed onto an optical channel. Each of the plurality of polarization controllers avoids error prone polarization states responsive to feedback. Each of the plurality of polarization controllers is configured to dynamically adjust and can include a dynamic control algorithm including one of gradient search, particle swarm optimization, genetic algorithms, and simulated annealing.

In yet another exemplary embodiment of the present invention, a network which includes mitigation of polarization mode dispersion impairments in fiber optic links includes two or more nodes interconnected with a plurality of fiber optic links, wherein each of the two or more nodes includes at least one optical receiver configured to detect pre-corrected FEC error rates; at least one polarization controller on one of the plurality of fiber optic links, wherein a clock in the at least one polarization controller is synchronized to a clock in the at least one optical receiver at each of the two or more nodes; and a processor configured to correlate detected pre-corrected FEC error rates at each of the at least one optical receiver at each of the two or more nodes to polarization states of the at least one polarization controller, wherein the processor communicates to the at least one polarization controller, and wherein the at least one polarization controller is dynamically adjusted avoiding identified polarization states with the detected worst-case pre-corrected FEC errors. Optionally, the two or more nodes include at least three nodes in a mesh configuration; wherein the at least one polarization controller includes at least two polarization controllers on separate fiber links between the at least three nodes; and the processor is configured to correlate detected pre-corrected FEC error rates responsive to location on the plurality of fiber links. The processor can be further configured to maintain statistics corresponding to improved polarization states based on pre-corrected FEC error rate analysis over time. Optionally, the processor is further configured to update each of the at least two polarization controllers through with the improved polarization states. Alternatively, the two or more nodes utilize dense wave division multiplexing.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for the mitigation of PMD impairments in fiber optic links. The present invention utilizes synchronous polarization modulation and digital control of polarization modulation, instead of independent polarization modulators and analog control used in the current state of art. Also, the present invention utilizes a feedback loop to improve identified polarization states instead of a random open loop operation. Further, the present invention includes a mechanism to continually update and improve polarization states based on pre-corrected FEC error rate analysis from data receivers. Additionally, the present invention includes a mechanism for collecting and correlating error feedback signals from multiple geographically-diverse network nodes. Advantageously, the present invention provides a cost-effective and efficient way to implement mitigation of PMD impairments, while using only a small fraction of the FEC error correction capability.

Figure 1:
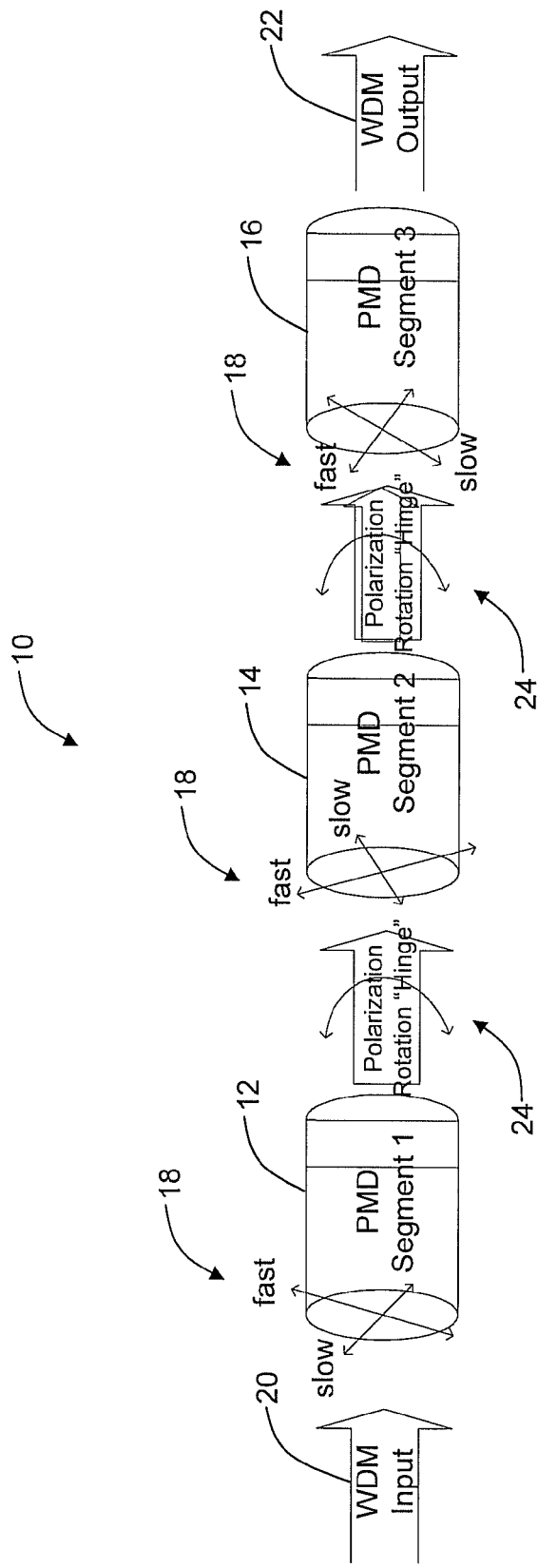
FIG. 1 is a diagram of a representative fiber-optic link with one or more fiber-optic segments that have associated PMD values according to an exemplary embodiment of the present invention.

Referring to FIG. 1, a representative fiber-optic link 10 can include one or more fiber-optic segments 12, 14, 16 that have associated principal state of polarization angle 18 according to an exemplary embodiment of the present invention. The representative fiber-optic link 10 includes a WDM input 20 followed by the one or more fiber-optic segments 12, 14, 16 and a WDM output 22. Each of the one or more fiber-optic segments 12, 14, 16 include the associated principal state of polarization angle 18 for a fast and a slow axis. In between each of the one or more fiber-optic segments 12, 14, 16, a polarization rotation "hinge" 24 provides relative realignment of the associated principal state of polarization angle 18 between the one or more fiber-optic segments 12, 14, 16.

Figure 2:
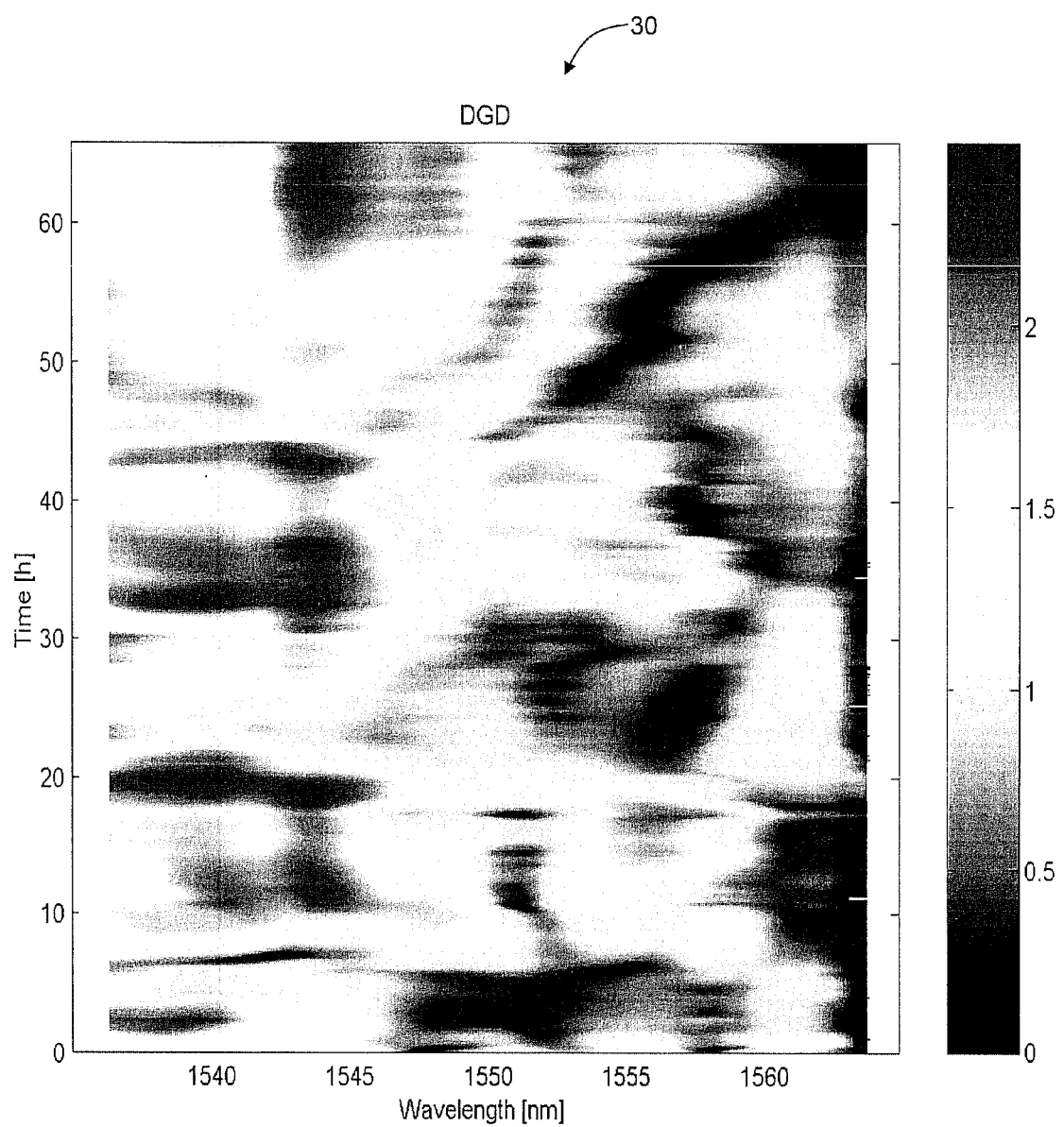
FIG. 2 is a plot of PMD in a field deployed fiber optic link according to an exemplary embodiment of the present invention.

The actual PMD states of the fiber optic segments 12, 14, 16 tend to be persistent in time for long durations. Referring to FIG. 2, a plot 30 illustrates PMD in a field deployed fiber optic link according to an exemplary embodiment of the present invention. FIG. 2 is taken from FIG. 12 of "Polarization Mode Dispersion of Installed Fibers", M. Brodsky, et al., J. Lightwave Techn., vo. 24, no. 6, December 2006, pp. 4584-4599. The plot 30 shows Differential Group Delay (DGD) versus time (in hours) and wavelength (in nm). The plot 30 illustrates a long-term DGD measurement for an amplified link with periodic spans and equal PMD of spans. Note some diurnal repeatability together with smaller and faster oscillations, most clearly seen at 1553 nm around the 60-h mark.

For example, a vertical cut through the plot 30 would show a time-domain plot for PMD in a field deployed fiber optic link at a particular wavelength, and would show a constant PMD state for a duration approaching hours. The actual orientations of the principal Fast and Slow states of polarization of the PMD segments are random over channel frequencies and over longer time durations.

PMD states are highly correlated for nearby frequencies. For example, a horizontal cut thorough FIG. 2 would show the correlation at a specific time. The channel frequencies lose their PMD correlation over the bandwidth defined by $$\Delta v > \frac{1}{8 \langle DGD \rangle}, \text{ where } \Delta v \text{ is change in bandwidth}$$

Assuming a section <DGD>~6 ps, Δv>21 GHz. Thus, wavelengths spaced by 50 GHz or higher as is common in Dense WDM systems may be assumed substantially decorrelated.

Figure 3:
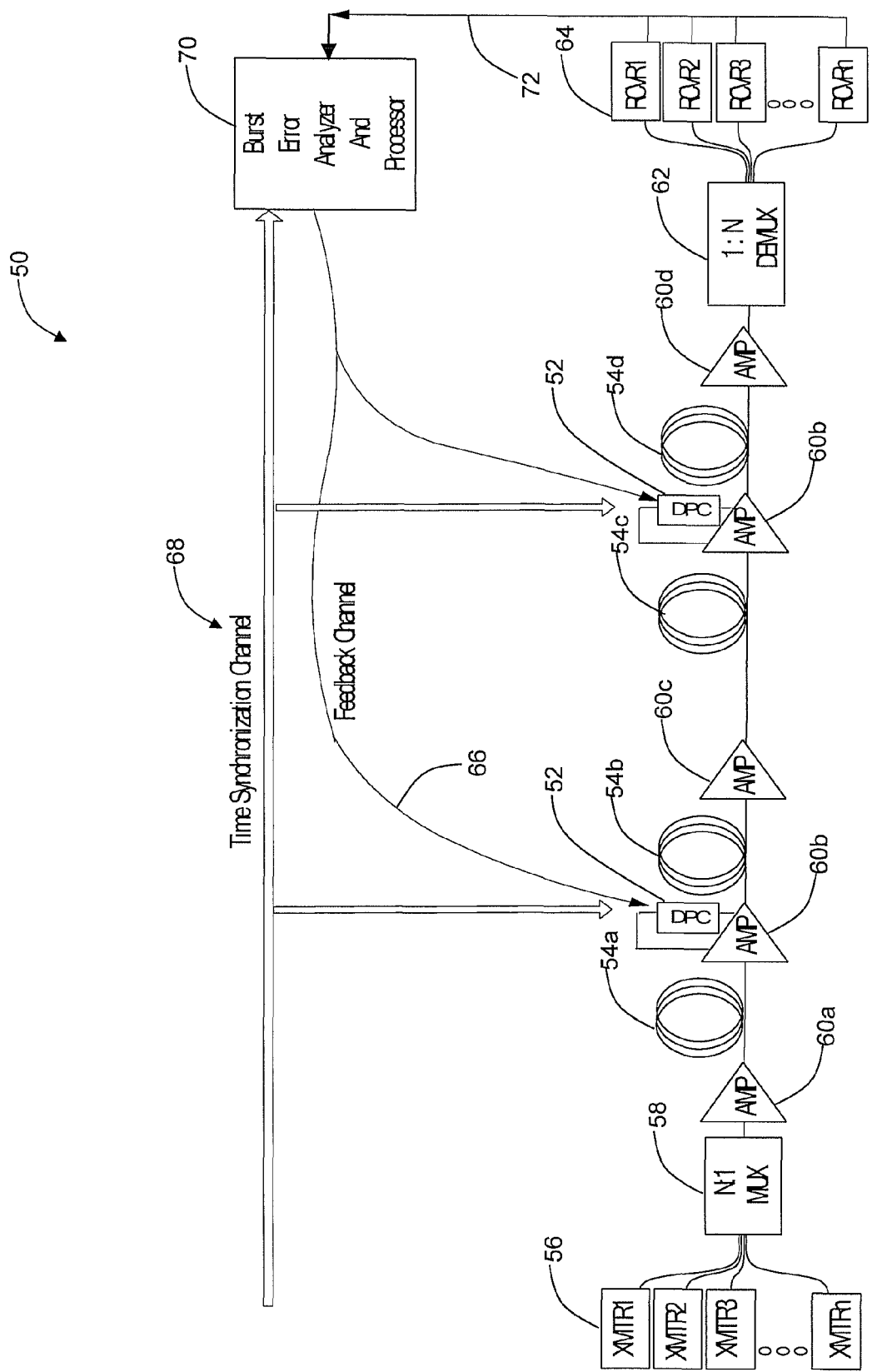
FIG. 3 is a diagram of a fiber-optic system with polarization modulators located at intervals along the route, between fiber segments according to an exemplary embodiment of the present invention.

Referring to FIG. 3, a fiber-optic system 50 is illustrated with polarization modulators 52 located at intervals along the route, between fiber segments 54 according to an exemplary embodiment of the present invention. The fiber-optic system 50 includes one or more transmitters (XMTR) 56 connected to a N:1 multiplexer 58, such as an arrayed waveguide (AWG) or the like. The N:1 multiplexer 58 is configured to receive up to N wavelengths from the transmitters 56 and provide a single wavelength division multiplexed output which is connected to an optical amplifier 60a for post-amplification. For example, the fiber segments 54 can correspond to the fiber-optic segments 12, 14, 16 in FIG. 1.

An output from the optical amplifier 60a traverses the first fiber segment 54a to an intermediate optical amplifier 60b, and then over the second fiber segment 54b to another intermediate optical amplifier 60c. The output continues to over a third fiber segment 54c to another intermediate optical amplifier 60b, and then over the fourth fiber segment 54d to an optical amplifier 60d for pre-amplification. An output from the optical amplifier 60d is connected to a 1:N demultiplexer 62 which is configured to split N wavelengths out to individual receivers (RCVR) 64.

The optical amplifier 60 can include an erbium-doped fiber amplifier (EDFA) or the like. Each of the optical amplifiers 60 can include a mid-stage access point. In the example of FIG. 3, optical amplifier 60a is a post-amplifier, optical amplifier 60d is a pre-amplifier, and optical amplifiers 60b, 60c are intermediate optical amplifiers. For illustration purposes, FIG. 3 shows a uni-directional system, and those of ordinary skill in the art will recognize the fiber-optic system 50 can include a second grouping of fiber segments 54 and associated equipment 56, 58, 60, 62, 64 for a counter-propagating signal to form a bi-directional system. Additionally, the fiber-optic system 50 can include other components as are known in the art, such as, for example, dispersion compensation modules, optical add/drop modules, and the like.

The present invention utilizes the polarization modulators 52 at intervals along the route (in FIG. 3, in the mid-stage at optical amplifiers 60*b*). The polarization modulators 52 can be implemented in many technologies known in the art, such as, for example, $LiNbO_3$ based modulators, fiber mechanical squeezers and/or rotators, liquid crystal cells, magneto-optic rotators, and the like.

Each stage of a single polarization modulator unit 52 is driven by a digital signal 66 in a time-synchronized, deterministic fashion. Further, a communication channel 68 is provided, such that all of the polarization modulator units 52 located along the fiber-optic link are operated in a relatively synchronized fashion. The communication channel 68 can be a separate Optical Supervisory Channel (OSC), a time stamp message superimposed onto the existing data carrying WDM channel, or the like. The communication channel 68 provides time synchronization to periodically update and assure all clocks associated with polarization controllers in the polarization modulator units 52 are referenced to the same relative time.

The receivers 64 detect pre-corrected errors through FEC mechanisms and identify the time location of the errors relative to the synchronization signals on the communication channel 68. This information is provided to an error rate analyzer and processor 70 through a communication link 72. The burst error analyzer and processor 70 is synchronized through the communication channel 68, and is configured to provide the digital signal 66 to drive each of the polarization modulator units 52, i.e. the digital signal 66 provides a feedback channel. In turn, the polarization modulators 52 identify specific polarization states that correspond to the condition that improves worst-case error rate. Effectively, the pre-corrected error analyzer and processor 70 is configured to correlate specific polarization states responsive to errors from the receivers 64. As bad polarization states are identified, local polarization controller algorithms steer operation away from such states.

Advantageously, the result is that an operating system is effectively trained to avoid error prone states in a dynamically adjusted fashion. Thus, less of FEC error correction capability is expended on PMD, and more is available for improved system performance in other areas, reduced system cost, etc.

Figure 4A:
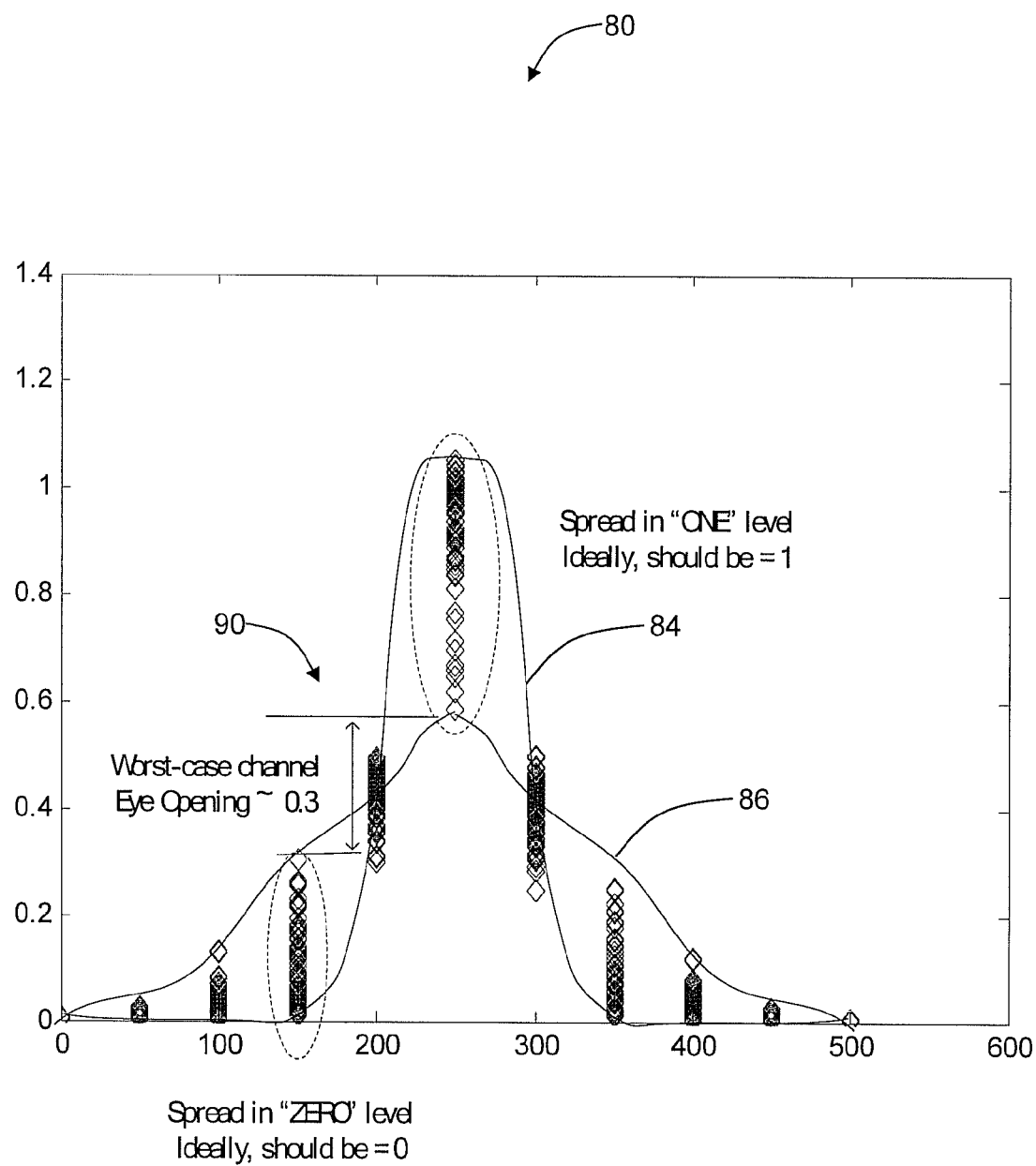
FIGS. 4a and 4b are graphs of amplitude-modulated optical pulse shape distribution over all channels without (FIG. 4a) and with (FIG. 4b) polarization control according to an exemplary embodiment of the present invention.
Figure 4B:
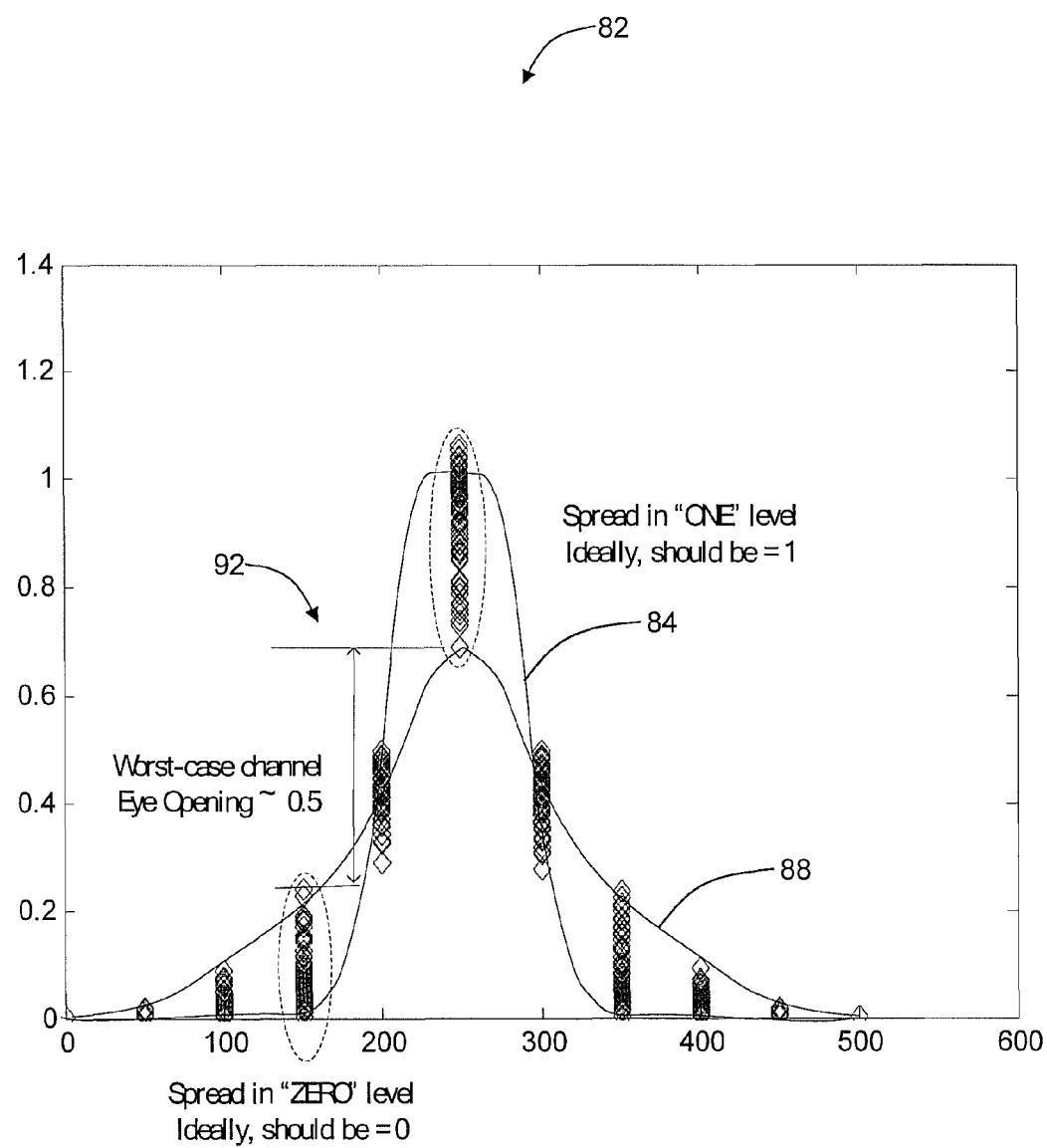

Referring to FIGS. 4*a* and 4*b*, graphs 80, 82 illustrate system performance without (FIG. 4*a*) and with (FIG. 4*b*) polarization control according to an exemplary embodiment of the present invention. The graphs 80, 82 provide an example of performance improvement for a fiber-optic system including ten high-PMD segments. The system can carry 80 channels of 10 Gb/s non-return-to-zero (NRZ) format data. In the initial simulation, assume each section has 6 ps of fixed DGD value (i.e., not statistically distributed), which includes a close to worst-case estimation. The principal state of polarization (PSP) for each segment is assumed to be random for each wavelength, while polarization control is applied in the same way to all wavelengths. Thus, as polarization control is realized, some channels may become worse, and some better. It is an object of the control algorithm to improve the worst-case state looking at all channels.

The graphs 80, 82 plot a pulse shape distribution over all wavelength channels (in ps). Each of the graphs 80, 82 include an overlaid ideal pulse shape 84 corresponding to a received signal without impairments due to PMD. The graph 80 includes a distorted pulse shape 86 corresponding to system performance without polarization control. The graph 82 includes a distorted pulse shape 88 corresponding to system performance with polarization control of the present invention. Also, each of the graphs 80, 82 include multiple data points corresponding to received data over all channels to illustrate statistical nature of the eye opening.

In graph 80, a worst-case eye opening 90 is reduced to approximately 0.3 for some channels due to PMD impairments. Introducing a simple single-stage waveplate improves the eye opening for a worst-case channel as shown in graph 82 with a worst-case eye opening 92 of approximately 0.5. The exact order of the waveplate is not critical, and $\lambda/2$, $\lambda/4$ and $\lambda/8$ waveplates produce similar results. Simulations also showed that introducing a larger number of controlled waveplates between the fiber segments did not substantially improve the results, while introducing a large increase in control cost and complexity.

Figure 5:
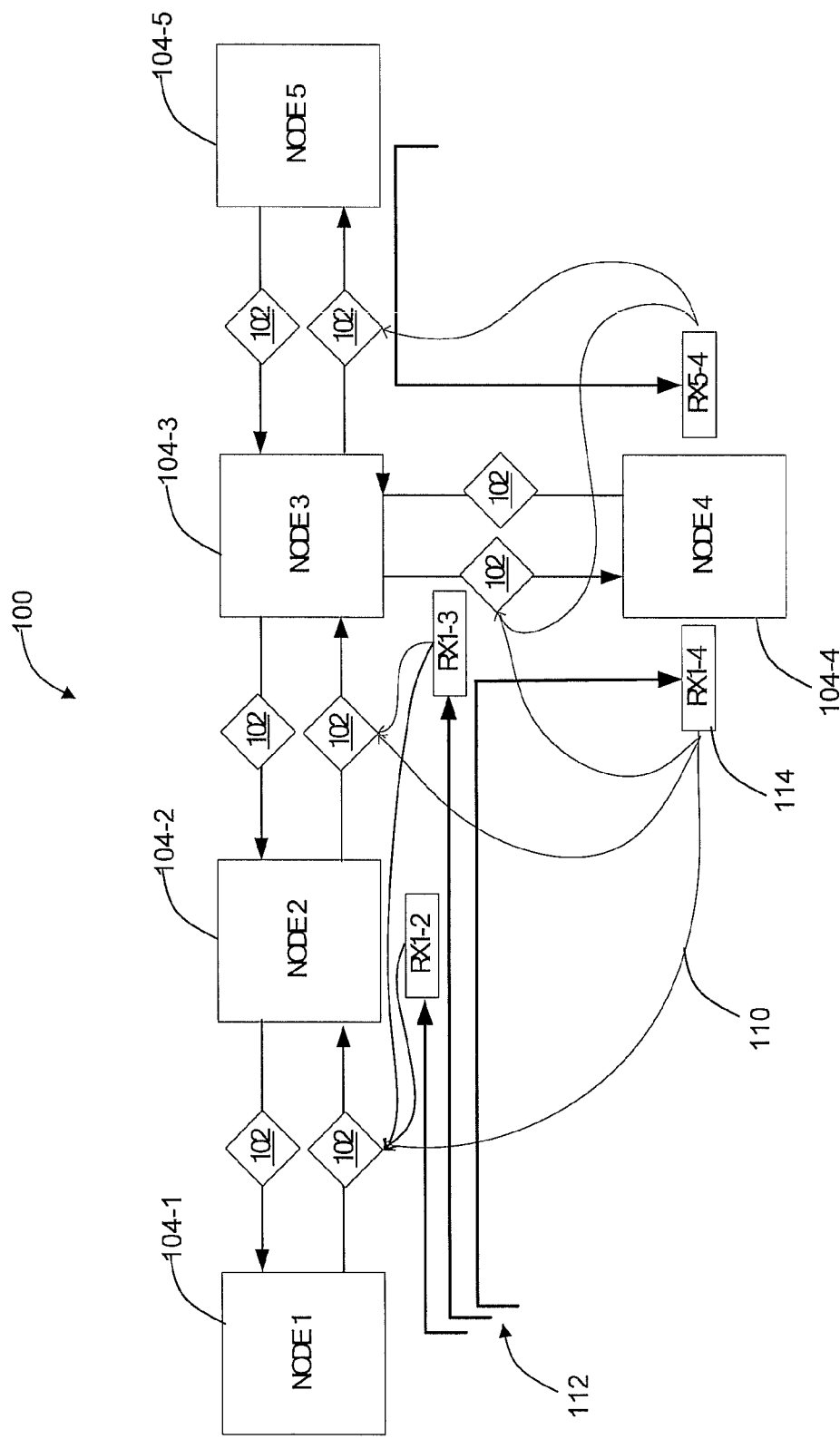
FIG. 5 is a diagram of an optical meshed network utilizing multiple polarization controllers according to an exemplary embodiment of the present invention.

Referring to FIG. 5, an optical meshed network 100 is illustrated utilizing multiple polarization controllers (PCs) 102 according to an exemplary embodiment of the present invention. FIG. 3 illustrates a single point-to-point optical system. Real optical networks introduce and additional complications by introducing optical switching and multiplexing nodes and diverse optical paths for various optical channels. For example, optical meshed network 100 includes five nodes 104. Nodes 104-1, 104-4 and 104-5 terminate all input optical channels. Node 104-2 can add/drop channels from either of two directions, or can express them onto the directions. Node 104-3 has three associated diverse directions, and add/drop channels and express channels among the directions. The nodes 104 can be separated by many hundreds of kilometers in a real network, requiring a way to synchronize and correlate feedback signals, e.g. a feedback signal 110 provided to each PC 102 and a synchronization signal 112 provided to each receiver 114 and PC 102.

Each polarization controller 102 associated with an optical fiber segment connecting the nodes 104 acts on all the channels that are optically passed through it. Thus, the feedback signal 110 for each polarization controller 102 needs to be collected from a diverse set of nodes 104. As an example, polarization controller 102 on the Node 104-1 to Node 104-2 segment collects feedback from receivers 114 in Nodes 104-2, 104-3 and 104-4. Polarization controller 102 on the Node 104-3 to Node 104-4 segment collects feedback from receivers in Node 104-4 only.

The problem of associating a particular polarization controller state with the feedback signal 110 is done via time-stamping the states in the feedback signals 110. Thus, a specific polarization controller 102 collects responses arriving from different channel destination nodes, and correlates the responses that correspond to the same time utilizing the synchronization signal 112, and provides an internal algorithm to adjust its state towards a configuration that minimizes a worst-case error function.

The algorithms used to dynamically control the polarization controllers 102 can be any number of well know algorithms, including gradient search, or any number of evolutionary algorithms such as particle swarm optimization, genetic, simulated annealing, and the like. Advantageously, the result is that an operating system is effectively trained to avoid error prone states in a dynamically adjusted fashion.

Figure 6:
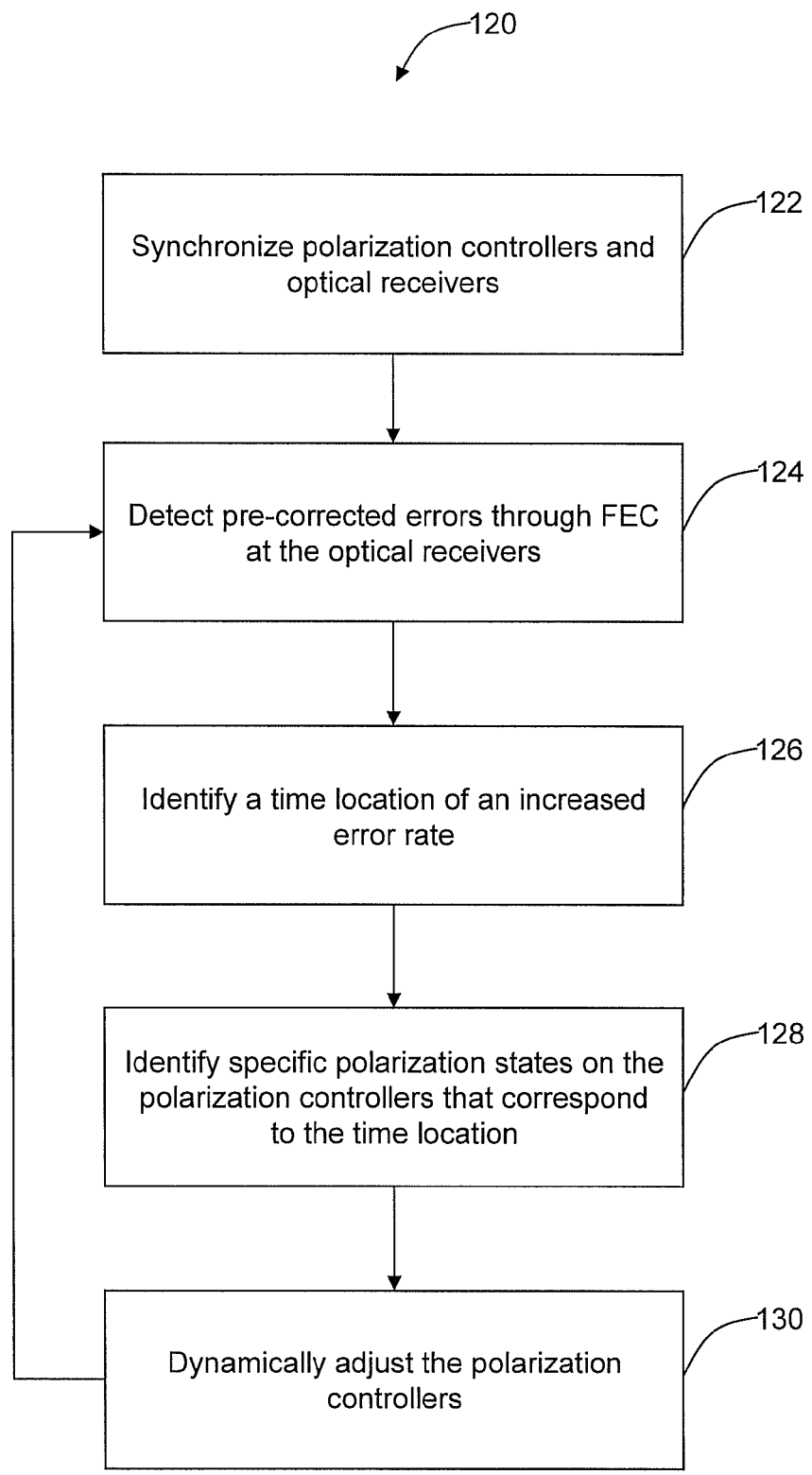
FIG. 6 is a flowchart of a polarization control mechanism according to an exemplary embodiment of the present invention.

Referring to FIG. 6, a flowchart illustrates a polarization control mechanism 120 according to an exemplary embodiment of the present invention. Polarization controllers and optical receivers are synchronized (step 122). Here, a clock associated with each of the polarization controllers and optical receivers is kept synchronized through a timing signal (e.g., through an OSC connection, embedded on optical wavelengths, global positioning satellite (GPS), or the like). The optical receivers utilize FEC to detect pre-corrected error rates (step 124). An increase in a worst-case error rate may correspond to impairments due to PMD, i.e. bad polarization states. A time location is identified of the increased error rate (step 126). Synchronization of clocks for the polarization controllers and optical receivers enables the time location to be identified.

The specific polarization states on the polarization controllers are identified that correspond to the identified time location (step 128). Here, the polarization control mechanism 120 correlates specific polarization states responsive to increased worst-case error rate from the optical receivers. The polarization controllers are dynamically adjusted accordingly (step 130). With bad polarization states identified, each local polarization controller can adjust its control algorithm to steer operation away from such states.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for mitigating polarization mode dispersion impairments in fiber optic links, comprising:
    (a) synchronizing a clock associated with a polarization controller and a clock associated with an optical receiver;
    (b) using a processor connected to the polarization controller and the optical receiver, detecting pre-corrected FEC errors at the optical receiver;
    (c) using the processor, identifying a time corresponding to the pre-corrected FEC errors;
    (d) using the processor, identifying specific polarization states on the polarization controller corresponding to the time; and
    (e) using the processor, dynamically adjusting the polarization controller.

2. The method of claim 1, wherein the polarization controller comprises a first polarization controller and the optical receiver comprises a first optical receiver; and further comprising:
    synchronizing a clock associated with a second polarization controller, a clock associated with a second optical receiver, the clock associated with the first optical receiver, and the clock associated with the first polarization controller;
    using the processor, detecting pre-corrected FEC errors at either the first optical receiver or the second optical receiver;
    using the processor, identifying a time corresponding to the pre-corrected FEC errors;
    using the processor, identifying specific polarization states on the first polarization controller and the second polarization controller corresponding to the time; and
    using the processor, dynamically adjusting the first polarization controller and the second polarization controller.

3. The method of claim 2, wherein first polarization controller and the second polarization controller utilize synchronous polarization modulation control.

4. The method of claim 1, further comprising:
    repeating steps (a) through (e) over time;
    using the processor, updating controller polarization states based on pre-FEC error analysis over time; and
    using the processor, providing the polarization controller the improved polarization states.

5. The method of claim 1, wherein the polarization controller comprises a first polarization controller and the optical receiver comprises a first optical receiver; and further comprising:
    synchronizing a clock for each of a plurality of polarization controllers, a clock for each of a plurality of optical receivers, the clock associated with the first optical receiver, and the clock associated with the first polarization controller;
    using the processor, detecting pre-corrected FEC errors at either the first optical receiver or any of the plurality of optical receivers;
    using the processor, identifying a time corresponding to the pre-corrected FEC errors;
    using the processor, identifying specific polarization states on the first polarization controller and each of the plurality of polarization controllers corresponding to the time; and
    using the processor, dynamically adjusting the first polarization controller and each of the plurality of polarization controllers.

6. The method of claim 1, wherein the dynamically adjusting step avoids error prone polarization states responsive to the identifying specific polarization states step.

7. The method of claim 1, wherein the dynamically adjusting step comprises a dynamic control algorithm comprising one of gradient search, particle swarm optimization, genetic algorithms, and simulated annealing.

8. The method of claim 1, wherein the synchronizing step is performed through one of a time stamp in an optical supervisory channel and a time stamp message superimposed onto an optical channel.

9. A system for mitigating polarization mode dispersion impairments in fiber optic links, comprising:
    a processor connected to a plurality of polarization controllers and to a plurality of receivers, wherein a clock associated with each of the processor, the plurality of polarization controllers, and the plurality of receivers is synchronized;
    wherein the processor is configured to:
        receive data regarding pre-corrected FEC errors at one of the plurality of optical receivers;
        identify a time and polarization states on each of the plurality of polarization controllers corresponding to the data; and
        provide feedback to each of the plurality of polarization controllers responsive to the polarization states corresponding to the pre-corrected FEC errors.

10. The system of claim 9, wherein each of the plurality of polarization controllers is configured to dynamically adjust responsive to the feedback.

11. The system of claim 10, wherein the processor is further configured to maintain statistics corresponding to polarization states based on pre-corrected FEC error analysis over time.

12. The system of claim 11, wherein the processor is further configured to update each of the plurality of polarization controllers through the feedback with the polarization states producing an improved worst-cased pre-corrected FEC errors.

13. The system of claim 10, wherein each of the plurality of polarization controllers avoids error prone polarization states responsive to feedback.

14. The system of claim 10, wherein each of the plurality of polarization controllers is configured to dynamically adjust comprises a dynamic control algorithm comprising one of gradient search, particle swarm optimization, genetic algorithms, and simulated annealing.

15. The system of claim 9, wherein the clock associated with each of the processor, the plurality of polarization controllers, and the plurality of receivers is synchronized through one of a time stamp in an optical supervisory channel and a time stamp message superimposed onto an optical channel.

16. A network which includes mitigation of polarization mode dispersion impairments in fiber optic links, comprising:
two or more nodes interconnected with a plurality of fiber optic links, wherein each of the two or more nodes comprises at least one optical receiver configured to detect pre-corrected FEC errors;
at least one polarization controller on one of the plurality of fiber optic links, wherein a clock in the at least one polarization controller is synchronized to a clock in the at least one optical receiver at each of the two or more nodes; and
a processor configured to correlate detected pre-corrected FEC errors at each of the at least one optical receiver at each of the two or more nodes to polarization states of the at least one polarization controller, wherein the processor communicates to the at least one polarization controller, and wherein the at least one polarization controller is dynamically adjusted avoiding identified polarization states with the worst-case detected pre-corrected FEC errors.

17. The network of claim 16, wherein the two or more nodes comprise at least three nodes in a mesh configuration;
wherein the at least one polarization controller comprises at least two polarization controllers on separate fiber links between the at least three nodes; and
wherein the processor is configured to correlate detected burst errors responsive to location on the plurality of fiber links.

18. The network of claim 17, wherein the processor is further configured to maintain statistics corresponding to polarization states based on worst-case pre-corrected FEC error analysis over time.

19. The network of claim 18, wherein the processor is further configured to update each of the at least two polarization controllers through with the polarization states producing an improved worst-cased pre-corrected FEC errors.

20. The network of claim 16, wherein the two or more nodes utilize dense wave division multiplexing.

* * * * *